United States Patent [19]

Savale

[11] Patent Number: 4,856,928

[45] Date of Patent: Aug. 15, 1989

[54] SYSTEM FOR ASSEMBLING PANELS IN VARIOUS ANGULAR POSITIONS AND PANELS SUITABLE FOR THE USE OF THIS SYSTEM

[76] Inventor: Yves Savale, 5 rue des Tennerolles, 92210 Saint-Cloud, France

[21] Appl. No.: 127,201

[22] Filed: Dec. 1, 1987

[30] Foreign Application Priority Data

Dec. 1, 1986 [FR] France .................................. 86 16721

[51] Int. Cl.⁴ ................................................. F16B 1/00
[52] U.S. Cl. .................................... 403/217; 403/174; 403/178; 411/187
[58] Field of Search ............... 403/169, 170, 174, 178, 403/202, 217, 218, 219, 245, 246, 247, 256, 298, 264, 407.1; 411/185, 187, 222, 237, 408

[56] References Cited

U.S. PATENT DOCUMENTS 4,474,490 10/1984 Harper, Jr. ........................... 403/218

FOREIGN PATENT DOCUMENTS 2150998 7/1985 United Kingdom ................. 403/297

Primary Examiner—Randolph A. Reese
Assistant Examiner—Carol I. Bordas
Attorney, Agent, or Firm—Scully, Scott, Murphy & Presser

[57] ABSTRACT

An assembly for panels having a connection piece comprising a threaded male part with a cylindrical head, associated with a cylindrical female part of the same outside diameter as the head, the face of this head confronting the female part being recessed internally in such a way that the edge of the head projects laterally relative to the face in the direction of the female part. The system further includes a straight prism-shaped rod with a cross-section in the form of a regular polygon, this rod being intended to be engaged into a receptacle of matching shape made in the panels. The rod has, at one of its ends, a hook profile designed to cap the projecting part of the edge of the head. A removable pin is provided for locking the rod in position in the receptacles of matching profile of the panels.

7 Claims, 4 Drawing Sheets

SYSTEM FOR ASSEMBLING PANELS IN VARIOUS ANGULAR POSITIONS AND PANELS SUITABLE FOR THE USE OF THIS SYSTEM

BACKGROUND OF THE INVENTION

1. Field of the Invention

The present invention relates to a system for assembling panels in various angular positions. It also relates to panels suitable for the use of such a system.

2. Description of the Prior Art

It is known that, in order to display documents, divide a room of a building into several parts or decorate a place frequented by the public, it is customary to use generally rectangular panels of various dimensions and colors which are assembled in diverse positions at the places of use.

The panels placed next to one another can be arranged in the same plane, but can also form angles relative to one another, thereby producing dihedra with a vertical or horizontal edge. This results in effects which hold the attention of onlookers and make it possible to highlight the documents presented for viewing, where exhibition panels are concerned.

A large number of systems for assembling such panels have already been provided in the prior art, but there is no system which satisfies all the following conditions simultaneously:

the assembling of three panels to form two dihedra, the edges of which converge at a point where a single assembly system is located;

the possibility of arranging panels in any relative angular position from 0° to 360°;

the facility for the user to combine several panels in various positions by means of a single assembly system;

the possible locking of the panels in any assembled position;

assembling the panels without using any tool whatsoever; and the possible raising of a panel by means of the same system.

There are indeed assembly systems, for example using hinges, which satisfy some of these conditions and even two or three of them in isolation, but, as far as the Applicant is aware, no system of the prior art meets all these conditions.

SUMMARY OF THE INVENTION

The assembly system according to the invention, which has these advantages, is defined in that it comprises:

a connection piece composed of a threaded male part with a cylindrical head, associated with an internally threaded female part of the same outside diameter as the head, the face of this head confronting the female part being recessed internally, in such a way that the edge of the head projects laterally relative to the face in the direction of the female part, the dimensions of the male and female parts being such that these members can be assembled manually as a result of action on their respective edges, without the use of any tool;

a straight prism-shaped rod with a cross-section in the form of a regular polygon, this rod being intended to be engaged into a receptacle of matching shape made in the panels; this rod having, at one of its ends, a hook profile designed to cap the projecting part of the edge of the head; and a removable means for locking the rod in position in the receptacles of matching profile of the panels.

It is thus possible to fix a rod to a panel in a plurality of positions corresponding to the number of sides of the regular polygon of its cross-section, and fix this rod to the connection piece by gripping the associated hook between the head of the male part and the female part, likewise in a plurality of positions relative to the axis of this piece. It will be seen that, if action is taken in this way on the positions of a rod associated wth one and the same panel and with one and the same connection piece, it is possible to vary at will the assembly positions of such panels, and in particular their angular arrangement. This will be illustrated below with reference to the accompanying drawings.

For some methods of assembly, the connection piece can advantageously be doubled, one and the same head being equipped with a threaded male part on each of its faces, with a cylindrical internally threaded female part associated with each male part, the two faces of the head being recessed opposite the female parts.

As mentioned, the head of the connection piece and the female part or female parts will have a cylindrical profile of the same outside diameter. To make it easier to grasp them and actuate them without a tool, their edges will preferably be knurled or rose-engine-turned.

The means for locking the rod in its receptacle can be formed, in a simple way, by a pin, a staple, a clip or the like, engaged in an annular groove made on the periphery of the rod and into an orifice in the associated panel.

The invention also comprises a panel suitable for the use of the above-defined assembly system, this panel being defined in that it has at least one prism-shaped recess, the cross-section of which is a regular polygon designed to receive a rod of matching profile of the assembly system.

The recess will preferably be made along one edge of the panel, in such a way that the face of the rod adjacent to the edge is flush with this edge.

In a preferred embodiment, the panel will be scalloped at one of its corners, in order to clear a place for the associated connection piece, and the part of the panel adjacent to this connection piece will become thinner in the direction of the axis of the latter, in order to make it easier to fit two panels, the plane of which passes through the axis, in proximity to one another.

The panels can, of course, be made of various materials suitable for their use. To make it easier to fit them and remove them, they can advantageously have a core in the form of a honeycomb or the like, interposed between two plane sheets made of metal or plastic, the assembly as a whole thus forming a structure which is both light and rigid.

BRIEF DESCRIPTION OF THE DRAWINGS

The accompanying drawings which are not of a limiting nature illustrate various embodiments and uses of the invention. In these drawings.

DETAILED DESCRIPTION OF THE PREFERRED EMBODIMENTS

Figure 1:
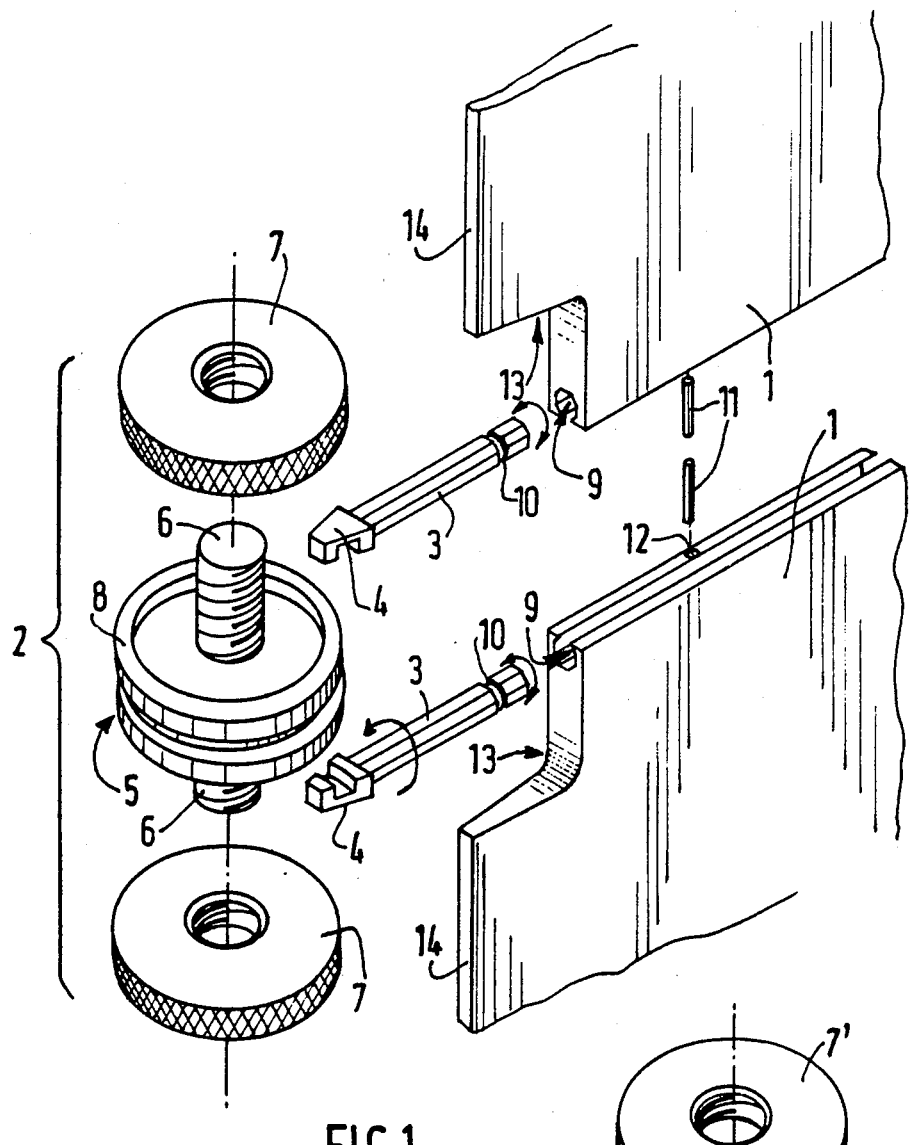
FIG. 1 is an exploded perspective view showing the assembly system according to the invention, with a double connection piece used for assembling two panels.
Figure 2:
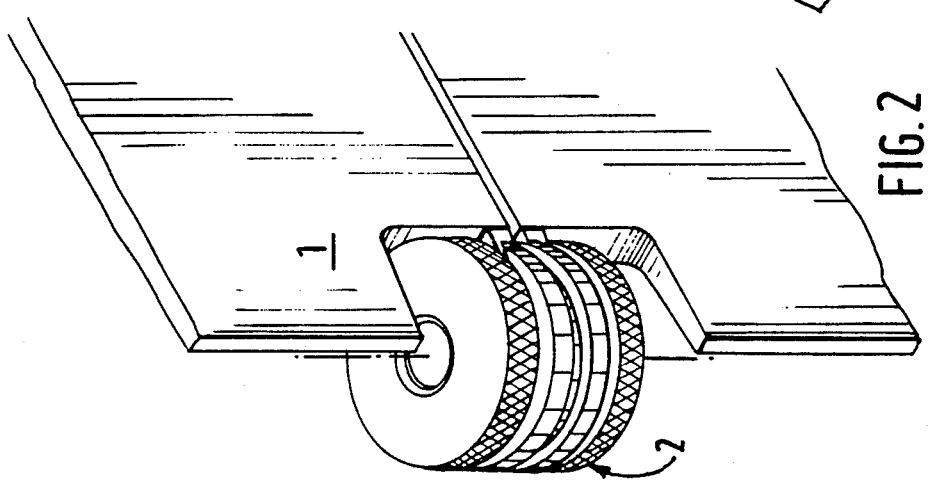
FIG. 2 illustrates the system of FIG. 1 in the assembled position.

Reference will first be made to FIGS. 1 and 2 which illustrate the use of the assembly system according to the invention for assembling rigidly two panels 1 arranged in the same plane. The assembly system comprises a double connection piece, designated by the general reference 2, and two prism-shaped rods 3 with a cross-section in the form of a regular polygon, for example an octagon as in the drawing, ending in a hook 4 of U-shape cross-section interacting with the connection piece. The connection piece 2 comprises a double cylindrical head 5, on either side of which projects in its axis two screws 6, each interacting with a cylindrical nut 7. The two faces of the head 5 are recessed in such a way that the peripheral part of the head projects laterally at 8 in the direction of the corresponding nut. The part 8 has a shape matching the part of U-shape cross-section of the hook 4 which can thus cap this part 8 and be locked in this position by means of the corresponding nut 7.

The rods 3 can themselves be engaged in a plurality of positions into a recess 9 of matching profile made near one edge of the panels 1, in such a way that one face of the rod is flush with this edge. An annular groove 10 made on the periphery of the rods 3 makes it possible to lock these rods in their receptacles by means of a pin 11 engaged into an orifice 12 in the edge of the panels 1.

These panels are scalloped at 13 in their corner adjacent to the connection piece 2, so as to make it possible to arrange the corresponding edge 14 of the panels level with the axis of this piece. It will also be seen that, so that the edges 14 of two or more adjacent panels can be arranged in direct proximity to one another level with the axis of the connection piece (see FIG. 4), the panels become thinner in the direction of this edge.

Figure 3:
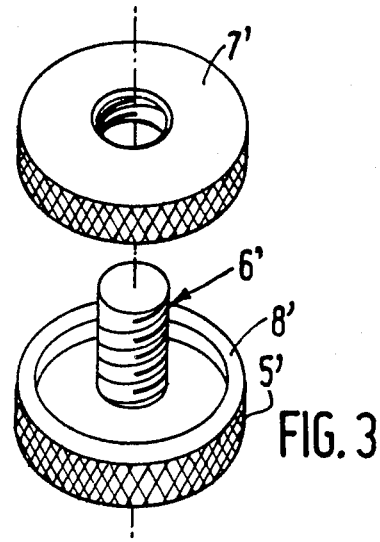
FIG. 3 is an exploded perspective view of a single connection piece.

Of course, the connection can be single instead of being double, as shown in FIG. 3, where the members already described are designated by the same reference numerals given the index '.

Figure 4:
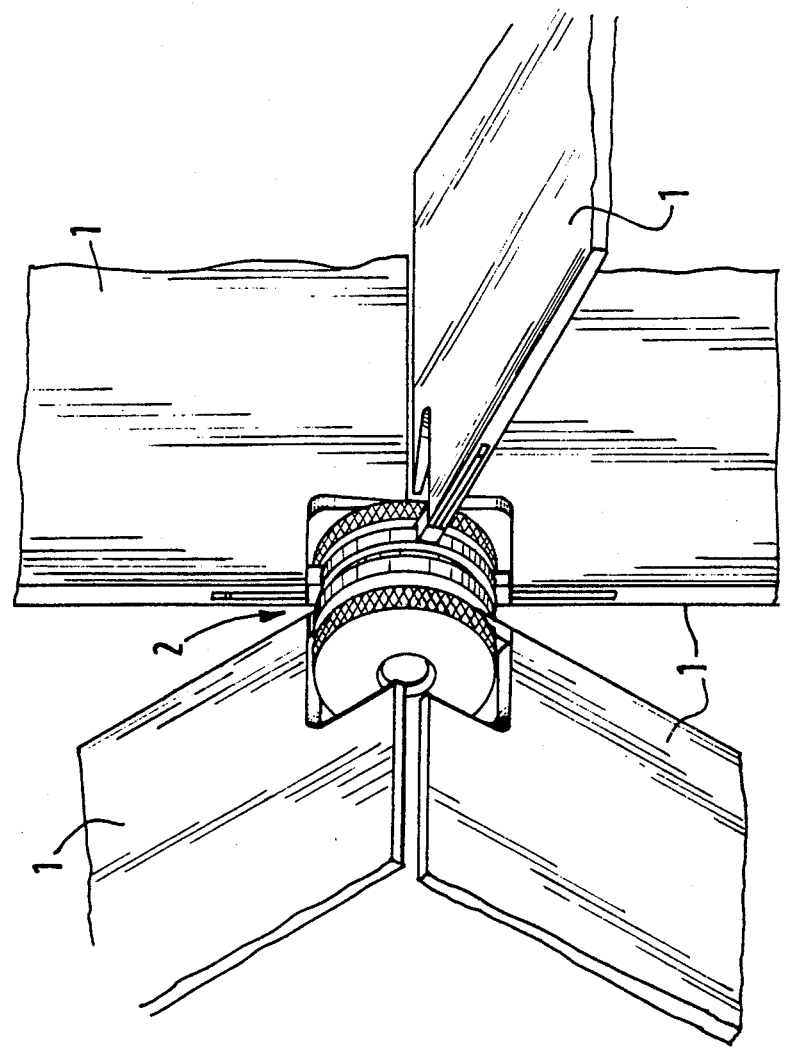
FIGS. 4, 5 and 6 illustrate the possibility of assembling various panels, combined by means of a single assembly system, in a plurality of angular positions.
Figure 5:
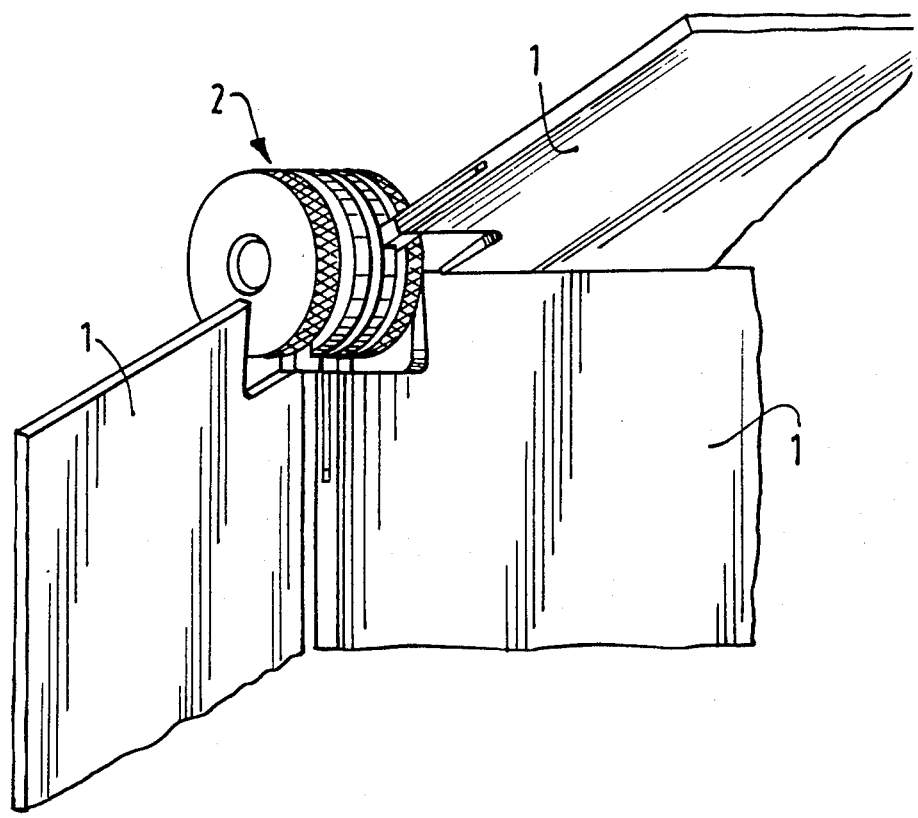
Figure 6:
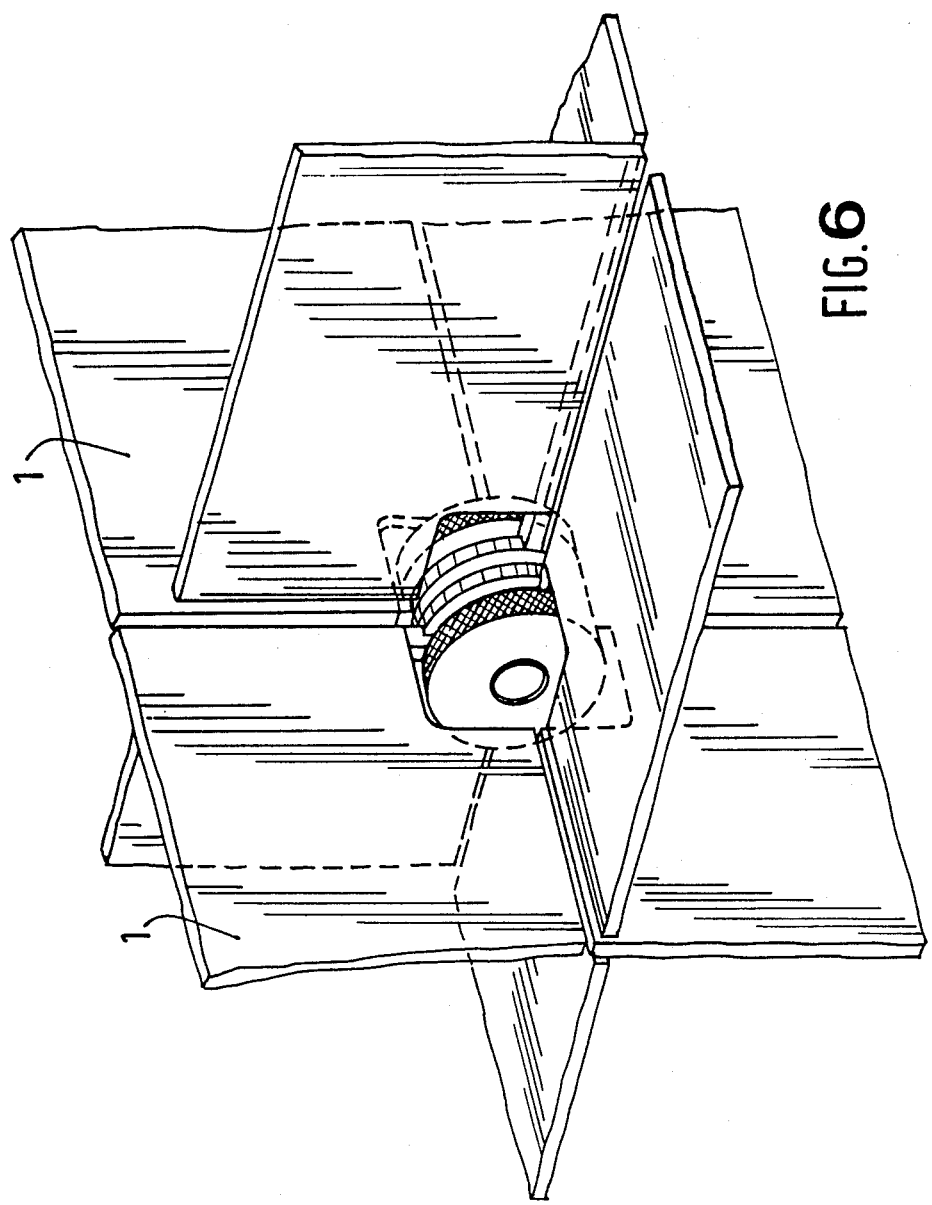

It can be seen that, by varying the position of the rods 3 on the same connection piece 2, as shown in FIG. 4, or by orienting these rods differently in their receptacles 9, it is possible, in a simple way, to assemble two or more adjacent panels in any relative angular position (see, for example, FIGS. 5 and 6).

It will be seen that the assembly or dismantling of the panels by means of the system which has just been described is carried out manually, without the need for any tool. As illustrated, so that the heads 5 and the nuts 7 of the connection pieces can be actuated easily by hand, their edge will be rose-engine-turned or knurled. This connection piece can be made of metal or plastic.

The invention thus provides a simple means for assembling rigidly in any relative angular position, without the use of tools, multi-purpose panels which it is just as easy to dismantle after use. Of course, the invention is not limited to the embodiments which have just been described, and it also embraces all the alternative forms which a person skilled in the art could imagine. Thus, for example, the panel recesses 9, into which the rods 3 are engaged, could be made in sections attached to the panels and not in the body of the panel itself.

I claim:

1. A system for assembling panels without the use of tools, comprising
    a connection piece having a threaded male part with a cylindrical head and a cylindrical female part of the same outside diameter as said head, the face of said head confronting said female part being recessed internally, in such a way that a peripheral edge of the head projects laterally relative to said face in a direction towards said female part;
    a straight prism-shaped rod having a cross-section in the form of a regular polygon which cooperates with a receptacle of matching shape provided in said panels, said rod having, at one of its ends, a hook profile for engaging said peripheral edge of said head; and
    a removable locking means for locking said rod in position in the receptacles of matching shape of said panels; wherein said locking means for locking the rod in said receptacle comprises a pin, a staple, a clip or the like, said pin being engagable into an annular groove on the periphery of said rod and into an orifice in the associated panel.

2. A system as claimed in claim 1, wherein the connection piece is double, the head being further provided with said threaded male part on each of its faces, with an internally threaded cylindrical female part associated with each male part, a peripheral edge of said head projecting laterally relative to each of its faces.

3. A system as claimed in claim 1 or 2, wherein the edge of said head and/or said female part is knurled or rose-engine-turned.

4. A panel for the use of a system as claimed in claim 1, said panel having at least one prism-shaped recess in the form of a regular polygon, wherein said recess cooperates with a rod of matching profile.

5. A panel as claimed in claim 4, wherein said prism-shaped recess is positioned along one edge of the panel, such that the face of said rod adjacent to said edge is in the same plane as said edge.

6. A panel as claimed in claims 4 or 5, wherein said panel is scalloped at a corner corresponding to a connection piece of said assembly system.

7. A panel as claimed in claim 4, wherein the edge of said panel has decreasing thickness in the direction of the edge corresponding to an axis of the connection piece of the assembly system.

* * * * *